No. 801,888. PATENTED OCT. 17, 1905.
R. LUNDELL.
ALTERNATING CURRENT MOTOR.
APPLICATION FILED JAN. 9, 1905.

WITNESSES:
C. E. Ashley
M. F. Keating

INVENTOR.
Robert Lundell
By his Attorney,
Charles J. Kintner

UNITED STATES PATENT OFFICE.

ROBERT LUNDELL, OF NEW YORK, N. Y.

ALTERNATING-CURRENT MOTOR.

No. 801,888.  Specification of Letters Patent.  Patented Oct. 17, 1905.

Application filed January 9, 1905. Serial No. 240,214.

*To all whom it may concern:*

Be it known that I, ROBERT LUNDELL, a citizen of the United States, residing in New York, borough of Manhattan, county and State of New York, have made a new and useful Invention in Alternating-Current Motors, of which the following is a specification, reference being made to the accompanying drawings, which form a part thereof.

My invention relates to that class of alternating-current motors which are supplied with commutators and brushes and which may be run at a nearly-constant or synchronous speed from a two-wire circuit.

The invention relates particularly to the class of alternating-current motors described by me in a prior United States application filed January 11, 1904, Serial No. 188,575, upon which the present invention may be said to be an amplification.

In the above-mentioned application I have shown and described the manner in which a single-phase alternating-current motor may be started from rest with or without load and which may be reversed at will.

My present invention has for its chief objects, first, the construction of a motor which is made self-starting (with a great starting torque) and which may afterward be caused to run at a nearly-constant or synchronous speed; second, a motor which may be caused to run at a nearly-constant speed in either direction; third, a motor which will be absolutely non-sparking at the brushes when run under normal conditions.

I accomplish the aforesaid objects with the novel apparatus shown in the accompanying drawings and described in the following specification. It is a well-known fact that an armature the winding of which is in any manner thoroughly short-circuited when once started to rotate in a single-phase alternating-current field-magnet will quickly run up to synchronous speed provided the load is light. The torque of such a short-circuited armature increases as synchronous speed is approached, and the load can then be correspondingly increased. The torque at the starting moment is, however, *nil*, and some artificial means must be employed in order to give the armature a fair start.

In the present invention I employ the same principle for starting as I have already fully described in the application above referred to, and synchronous speed is maintained upon a principle similar to the one that governs the rotation or synchronous running of a short-circuited armature.

Figure 1:
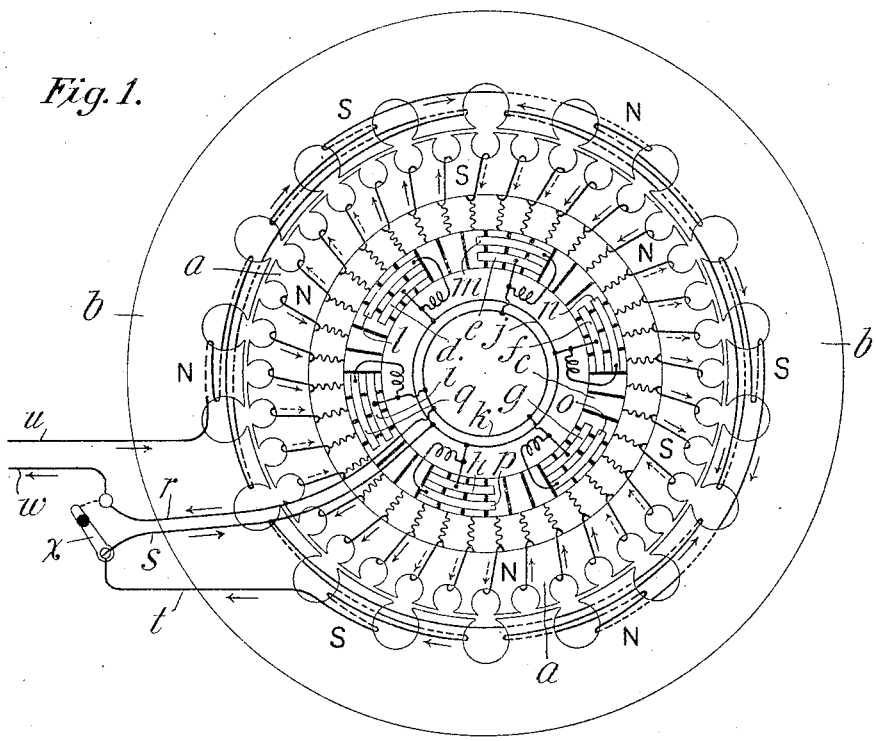
Figure 2:
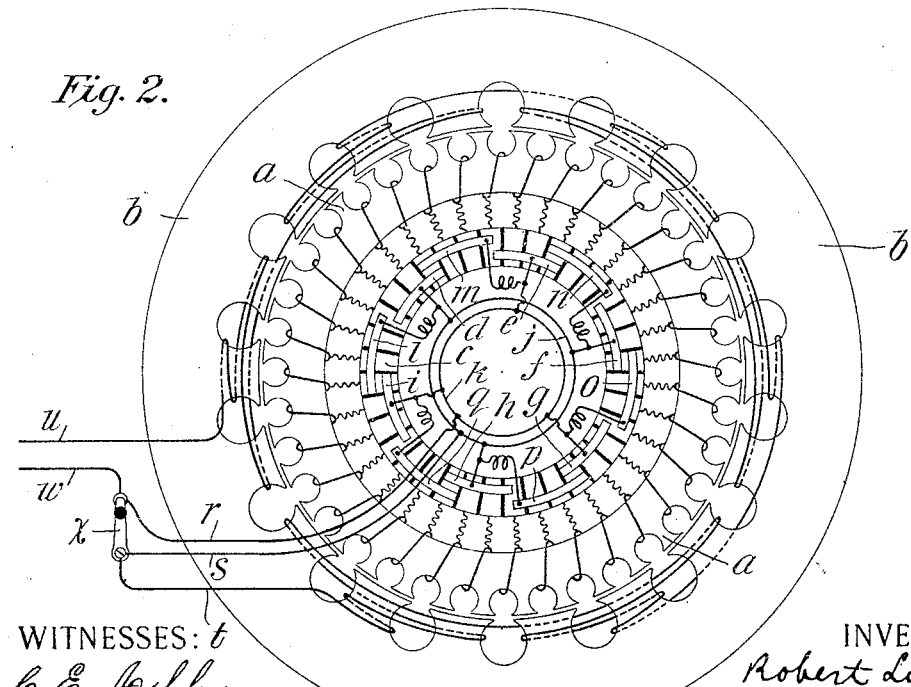

Referring now to the drawings, Figures 1 and 2 are both diagrammatic views of the apparatus. Fig. 1 represents the apparatus at the starting movement, and Fig. 2 at the time of synchronous running.

Referring now to Fig. 1 in detail, $a$ represents the armature of an alternating-current motor. $b$ represents a six-pole field-magnet of well-known alternating-current type, and $c$ represents the commutator.

$d\ e\ f\ g\ h\ i$ represent brushes which are alternately connected to bus-rings $j$ and $k$.

$l\ m\ n\ o\ p\ q$ represent another set of brushes, which are connected to the first set of brushes by flexible leads, as clearly shown in the drawings. The two sets of brushes are supposed to be movable independently of one another around a small angle on the commutator-surface in a manner which will be fully explained hereinafter.

$r$ and $s$ represent flexible cables or wires leading from the bus-rings $j\ k$ to a switch $x$, which when closed is arranged to short-circuit the two bus-rings.

$u$ and $w$ represent conductors leading to a source of alternating-current supply including a suitable current-regulator. (Not shown on the drawings.) The field-windings are such as to produce polarities of increasing strength toward the centers of the poles, as clearly indicated by the drawings.

The armature $a$ is furnished with a simple "gramme" or ring-winding (six-circuit winding) for the purpose of conveniently illustrating the direction of the currents in the numerous armature-coils at any given moment. Any well-known form of drum-winding would be more efficient and better suited for a commercial machine. The type of winding known as a "two-circuit multipolar" drum-winding is particularly to be recommended for this type of apparatus, because two sets of brushes instead of six sets would then be sufficient. The brushes, as will be seen on the drawings, are all designed to straddle or to short-circuit a number of commutator-bars and armature-coils. At the time of starting about half the number of commutator-bars and armature-coils are short-circuited by the brushes, each brush or contact-block being arranged to cover an angle of a little more than thirty degrees on a six-pole machine. At the time of synchronous running one set of brushes—*i. e.*, the outer set—has been rotated or moved to the position shown in Fig. 2, thus causing all the brushes, all the commutator-bars, and all the armature-coils to become electrically connected or short-circuited.

It will be understood that the arrows and the polarities N S (shown in Fig. 1) represent the direction of the currents in the various circuits and the resultant polarities at a certain moment. At the next moment the currents and polarities will be reversed, but the direction of rotation remains the same. The arrows drawn in full lines indicate the direction of the currents in the primary circuits leading to the source of current-supply, whereas the dotted arrows indicate the direction of the induced or secondary currents in those armature-coils which are short-circuited by the brushes.

As the operation of the motor at the time of starting is similar to the operation of the motor shown and described by me in the previous application above referred to it is deemed unnecessary to enter into a minute description of the details. Attention should, however, be called to the circuits as follows: The current enters at a given moment by conductor *u* into the field-windings, as shown by the arrows. From there it flows through conductors *t* and *s* to the bus-ring *j*, where the current divides itself into three circuits leading to the brushes *d* and *l*, *f* and *n*, *h* and *p*. From these brushes the current flows through six groups of armature-coils to the other brushes *e* and *m*, *g* and *o*, *i* and *q* to the other bus-ring *k* and finally through conductors *r* and *w* to the source of current-supply. The lines of force passing through the armature-core from the field-magnet poles have caused secondary or induced currents to flow in the remaining six groups of armature-coils which happen to be short-circuited by the brushes. The direction of those currents is indicated by the dotted arrows in Fig. 1. It will be evident from an examination of the direction of the currents that the polarities will be as indicated in Fig. 1—that is to say, the rotation of the armature will be in the direction of the hands on a clock.

In order to reverse the direction of rotation, it will only be necessary to move both sets of brushes a little over thirty degrees (approximately one-half of the polar pitch-angle) from left to right looking at the upper brushes. This reverses the polarities of the armature, and consequently the direction of rotation. Running in either direction, according to the position of the brushes, the armature gives an excellent torque because of the fact that the primary and secondary currents in the armature-coils are working together in harmony to produce polarities in the armature-core at the proper points.

Assuming now that the brushes are placed as shown in Fig. 1, the armature will start to rotate with a strong torque in the direction of the hands of a clock, as previously explained. When the armature has got a fair start, approximating synchronous speed, the outer brushes *l m n o p q* may be moved by the operator to the position shown in Fig. 2. This operation has caused all of the armature-coils to become electrically connected or short-circuited, and the armature will now continue to run like the short-circuited armature of an induction-motor. The switch *x* may now be closed for the purpose of cutting out any wasteful resistance in the circuit, including the conductors *r* and *s*, bus-rings *j* and *k*, and the two sets of brushes. The two sets of brushes will then be relieved of all duty except the one of short-circuiting the secondary currents in the armature-windings.

It should be pointed out right here that if the armature should happen to be wound for low potential it would be preferable to short-circuit the commutator-bars in the final running position (indicated in Fig. 2) with some well-known form of sliding metal ring which would have the advantage of reducing the contact resistance from one commutator-bar to another to a minimum. However, if the armature is wound for high potential—*i. e.*, a great many coils of many turns per coil—the arrangement illustrated is entirely satisfactory and has the advantage of mechanical simplicity. A high-potential two-circuit armature-winding (often called a series winding) requiring only two sets of brushes will naturally give ideal mechanical simplicity. It should also be pointed out that this type of motor should be designed with a comparatively large armature reaction—that is to say, the combined ampere turns per pole in the armature at the time of starting should be greater than the ampere turns per pole in the field-magnet. This reduces the short-circuited current in any one coil to an amount approximately equal to the current which flows in those armature-coils which are not short-circuited.

It will be noticed from inspection of Fig. 1 that the short-circuited or secondary currents in the coils which are next to the leaving edges of the brushes are flowing in the same direction as the primary currents in the adjacent coils. Now if these currents are approximately alike in amperes it follows that there can be no sparking at the brushes because there is no change of current strength in the coils which pass the leaving edges of the brushes.

The position of the brushes shown in Fig. 2 is such as to permit of no break in the current flowing in any armature-coil. All of the coils are now permanently short-circuited and there can be no sparking if the contact between the brushes and the commutator is perfect, as it should be.

Having thus described my invention, what I claim, and desire to secure by Letters Patent of the United States, is—

1. A single-phase alternating-current motor the armature of which is started to rotate in its field-magnet by the combined action of primary and secondary currents which are caused to flow through alternate groups of coils in the same armature-winding; in combination with means for short-circuiting all of the armature-coils after the starting has been effected.

2. In a single-phase alternating-current motor having the coils of its armature connected to a commutator, the combination of means for causing local or short-circuited currents to flow through certain groups of armature-coils; means for causing other currents from an outside source of alternating-current supply to flow through other groups of armature-coils, and additional means for short-circuiting all of the armature-coils for the purpose described.

3. An alternating-current motor having a stationary field-magnet connected to a source of alternating-current supply and an armature the coils of which are connected to a commutator; in combination with brushes for short-circuiting certain groups of armature-coils while certain other groups of armature-coils are included in the circuit of an outside source of current-supply, and means for short-circuiting all of the armature-coils after the motor has been started.

4. An alternating-current motor having the winding or coils of its armature connected to a commutator; in combination with (a) means for causing local or short-circuited currents to flow through certain groups or sections of armature-coils (b) means for causing other currents from an outside source of alternating-current supply to flow through other groups or sections of armature-coils, and (c) means for short-circuiting all of the armature-coils while the motor is running.

5. An alternating-current motor having the winding or coils of its armature connected to a commutator; in combination with (a) means for causing local or short-circuited currents to flow through approximately one-half or more of the armature-coils (b) means for causing other currents from an outside source of alternating-current supply to flow through the remaining armature-coils, and (c) means for short-circuiting all of the armature-coils at will.

6. An alternating-current motor having a stationary field-magnet and an armature the coils of which are connected to a commutator; in combination with two sets of brushes independently movable past one another in either direction, the chief characteristic being that each individual brush is extended through an angle approximately equal to one-half of the polar pitch-angle.

In testimony whereof I have signed my name to this specification in the presence of two subscribing witnesses.

ROBERT LUNDELL.

Witnesses:
C. J. KINTNER,
M. F. KEATING.